US012081457B2

(12) United States Patent
Tomasso

(10) Patent No.: US 12,081,457 B2
(45) Date of Patent: Sep. 3, 2024

(54) APPARATUS AND METHOD FOR SELECTING AND PROVIDING NETWORK EQUIPMENT SECURITY DESIGNATIONS

(71) Applicant: SIGMA DEFENSE SYSTEMS LLC, Perry, GA (US)

(72) Inventor: Keiron Christopher Tomasso, Turnersville, NJ (US)

(73) Assignee: SIGMA DEFENSE SYSTEMS LLC, Perry, GA (US)

(*) Notice: Subject to any disclaimer, the term of this patent is extended or adjusted under 35 U.S.C. 154(b) by 461 days.

(21) Appl. No.: 17/515,389

(22) Filed: Oct. 29, 2021

(65) Prior Publication Data
US 2022/0141157 A1   May 5, 2022

Related U.S. Application Data

(60) Provisional application No. 63/107,232, filed on Oct. 29, 2020.

(51) Int. Cl.
| | |
|---|---|
| *H05B 45/20* | (2020.01) |
| *H04L 9/40* | (2022.01) |
| *H04L 45/60* | (2022.01) |
| *H04L 49/40* | (2022.01) |

(52) U.S. Cl.
CPC .............. *H04L 49/40* (2013.01); *H04L 45/60* (2013.01); *H04L 63/205* (2013.01); *H05B 45/20* (2020.01)

(58) Field of Classification Search
CPC ....... H04L 49/40; H04L 45/60; H04L 63/205; H04L 63/105; H04L 63/20; H05B 45/20
See application file for complete search history.

(56) References Cited

U.S. PATENT DOCUMENTS

| | | | | |
|---|---|---|---|---|
| 10,510,222 | B2* | 12/2019 | Eddins | G08B 5/36 |
| 11,265,082 | B2* | 3/2022 | Pederson | H05B 47/11 |
| 11,284,484 | B1* | 3/2022 | Lester | H05B 47/19 |
| 11,719,400 | B2* | 8/2023 | Dansalami | F21V 23/0435 362/20 |
| 11,759,187 | B2* | 9/2023 | Sabo | A61B 90/36 606/42 |
| 2016/0165694 | A1* | 6/2016 | Pederson | H04B 10/116 315/131 |

* cited by examiner

*Primary Examiner* — Anthony Q Edwards
*Assistant Examiner* — Hung Q Dang
(74) *Attorney, Agent, or Firm* — VOLPE KOENIG

(57) ABSTRACT

The disclosure provides an equipment security designation system and method that leverages human psychological affinity for color-coding to inform a user of the particular security designations, or range of designations that apply to each of the particular available network components from which the user must choose to process any given document or information the user may handle.

7 Claims, 5 Drawing Sheets

APPARATUS AND METHOD FOR SELECTING AND PROVIDING NETWORK EQUIPMENT SECURITY DESIGNATIONS

CROSS REFERENCE TO RELATED APPLICATIONS

This application claims the benefit of U.S. Provisional Application No. 63/107,232, filed Oct. 29, 2020, which is incorporated herein by reference in its entirety.

FIELD OF INVENTION

This invention relates to the field of electronics and also relates to the field of information security (INFOSEC) and communications security (COMSEC).

BACKGROUND

A wide variety of network components and equipment can be used for transmitting information through a network. For example, a workplace, office or other space may be equipped with a variety of IP networking routers, switches, servers and other Information Technology (IT) related components, appliances or systems. Each of these components can be designated or approved for processing some particular types of classified information and not designated or approved for processing other types of classified information. Information itself can have a wide variety of classifications, e.g., private, confidential, for official use only, classified or privileged. In classified or mixed work environments, not every available network component will be designated or approved for processing every type of classified information.

At the same time, it is critical that a human worker in such an environment select a network component that is designated or approved for processing the particular classified document or other information the user will send. Accordingly, there is a growing need for devices and techniques that can quickly and unambiguously inform a user of the particular security designations, or range of designations that correspond to the various network components from which the user may choose to process information with a given security classification.

SUMMARY

The disclosure provides an equipment security designation apparatus and method that leverages human psychological affinity for color-coding to inform a user of the particular security designations, or range of designations that apply to each of the particular available network components from which the user must choose to process any given document or information the user may handle.

DETAILED DESCRIPTION OF THE PREFERRED EMBODIMENTS

In some complex secure computing environments, a network operator must utilize a number of various networking components designated or approved for use to process information having any of a number of different classification levels. For example, in a network implementation, one or more network components or devices may be designated or approved for processing 'Top Secret' information only. One or more other components or devices may be approved for processing both 'Secret' and 'Top Secret' information, but cannot be used to process any other type of information. Yet another component may be designated or approved for processing classified or privileged information, but that component may not be designated or approved for processing secret, or top secret information. It can be difficult for a human working in such a complex secure computing environment to easily remember which components or devices can be used to process which types of information.

While text labels can be affixed to components and devices to indicate equipment security designations, such labels have many drawbacks. For example, the text information on the labels may be in a language unfamiliar to one or more users. The text may be difficult to interpret even by a native speaker, e.g., when the text describes mixed classification uses. Further, text labels may be affixed to parts of components or devices that are not readily observable by a user, e.g., on the bottom or back panel of a component or device. Text labels may otherwise be obscured from the user's view, e.g., by components stacked on top of one other, placed under a desk or otherwise placed such that the text labels are obscured from view by structures or articles located proximate the component or device. The labels may become separated from the device, or may become worn or otherwise spoiled such that they are no longer legible.

Unlike text, color can be a universal language. The apparatus, system and method described below leverages human capability for recognizing and distinguishing color to provide apparatus, systems and methods that allow users working in complex network security environments to readily, reliably and efficiently recognize and distinguish various components or devices based on a device's particular designation, configuration, or approval for use with various particular types of classified information.

Figure 1:
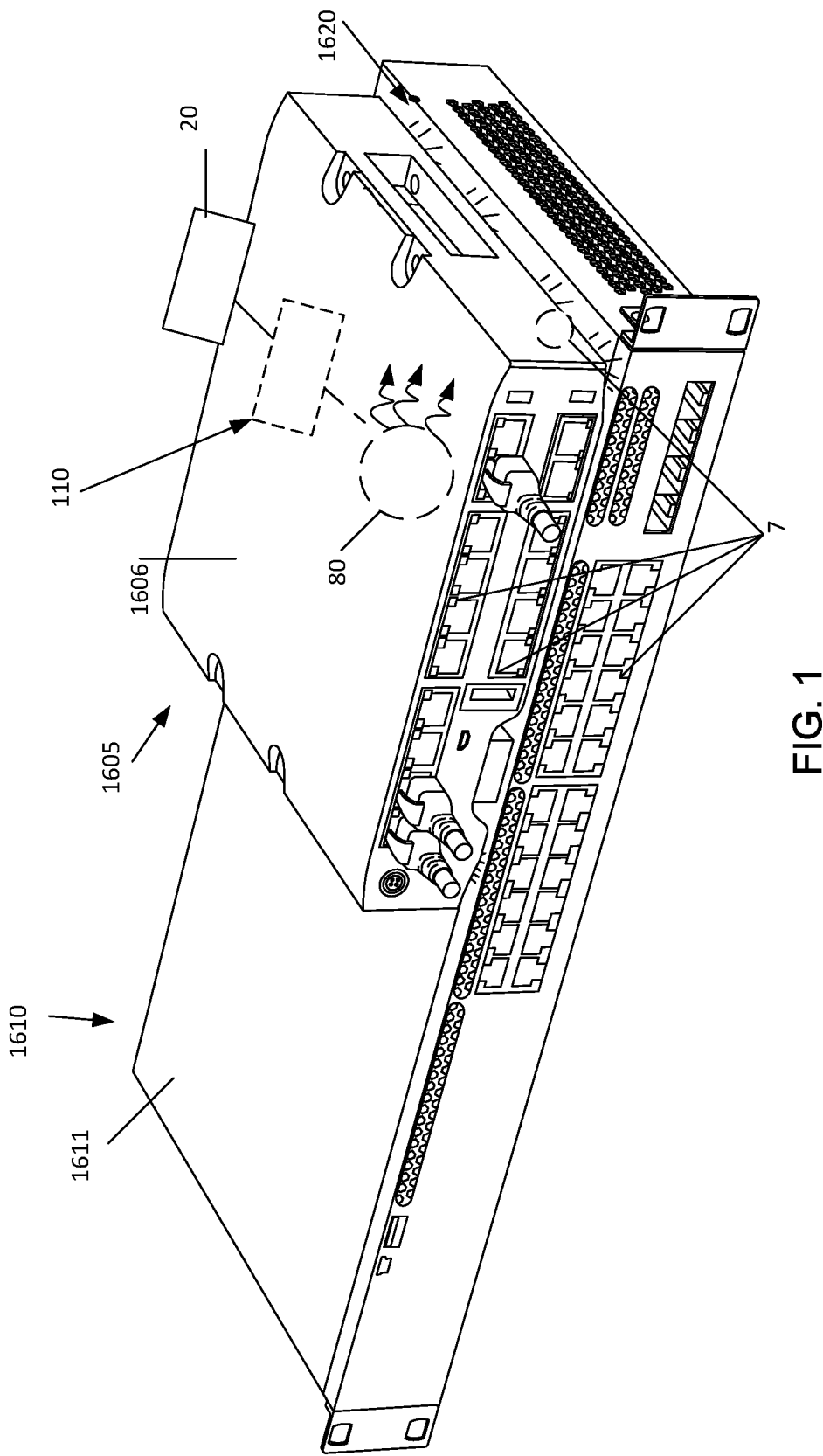
FIG. 1 depicts a stack of two network components for implementing embodiments disclosed herein.

FIG. 1 depicts a first network component 1605 and a second network component 1610. First network component 1605 can be designated or approved to process information having one or more of a plurality of possible security designations. Likewise, second network component 1610 can be designated or approved to process information having one or more of a plurality of possible security designations. The one or more security designations for component 1605 are not necessarily the same as those for component 1610.

Figure 2B:
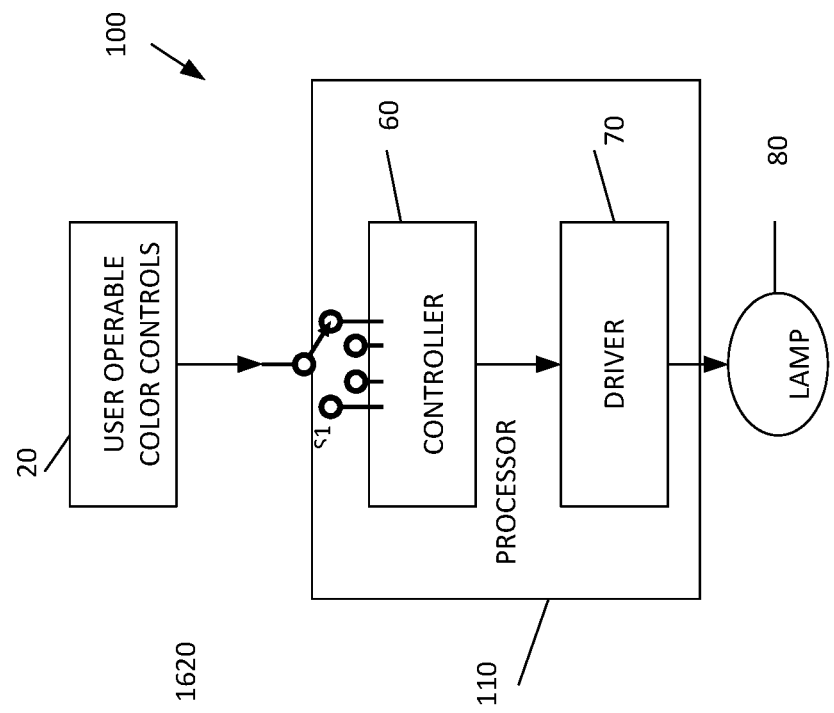
FIG. 2B is a block diagram illustrating light control components according to embodiments disclosed herein.

Network component 1605 is shown to be equipped with a lighting apparatus 100 (best illustrated in FIG. 2B). Lighting apparatus 100 comprises a user-operable lighting control switch 20, a light control processor 110 and at least one light-emitting element 80. Processor 110 and light emitting element 80 are disposed within housing 1606 of network component 1605. Lighting control processor 110 is coupled to light-emitting element 80 to provide drive signals to light emitting element 80 that cause element 80 to emit visible light (indicated, e.g., at 1620) of a user-selectable color. In some embodiments one or more light emitting elements 80 are arranged with respect to apertures 7 such that emitted light shines through apertures 7 thereby giving housing 1606 a glowing appearance when observed from outside housing 1606.

User-operable lighting control switch 20 is disposed external to housing 1606. User-operable lighting control switch 20 is coupled to lighting control processor 110 to provide control signals to processor 110 that vary in accordance with user manipulation of switch 20. In use, a user operates control switch 20 to control the one or more light emitting elements to cause them to emit light of one of a plurality of colors selectable by the user. The user can operate control switch 20 to control the one or more light emitting elements of first component 1605 to produce light of a color selected by the user to correspond to a particular security designation corresponding to first component 1605. For example, the emanating light may be a red color. Light with a red color may signify to the user that first component 1605 is designated or approved to process information having a classification level of "secret". Thereafter, the user can simply observe the color illuminating first component 1605 to quickly determine whether component 1605 is designated or approved for processing information having a given security classification the user may be handling.

In some embodiments one or more light-emitting elements 80 comprise light emitting diodes (LEDs). In some embodiments one or more light emitting elements 80 comprise a set of LEDs, e.g., one red, one green and one blue LED (RGB LEDs). In some embodiments a set of LEDS comprises many subsets of RDB LEDs. In some embodiments, the light color emitted by light emitting element 80 is set by user operation of switch 20 in cooperation with software. For example, switch 20 may have settings that correspond to "presets" or "macros" for setting the typical, most used or frequently used light colors or settings, e.g., 'Off', 'Green', 'Red', 'Orange'.

In some embodiments processor 110 comprises a micro controller programmed to send appropriate control voltages to individual ones of the Red Green and Blue (RGB) LEDs such that light emitted from each LED combines with light from other LEDs to produce light of a specific selected color. In some embodiments the micro controller can be programmed to produce a variety of pre-defined lighting effects ranging from a constant, steady illumination at a selected color, to flashing or pulsating effects in various selected colors. These effects can be set to occur at various time intervals to produce, e.g., a slow flashing of the emitted light, a fast flashing of the emitted light, or even a 'breathing' or other visual effect in any of a number of colors. Different illumination patterns may be associated with various operational modes or configurations of the network component 1605.

Housing 1606 is configured with one or more apertures 7 that pass therethrough light emitted by the one or more light-emitting elements 80. The one or more light emitting elements 80 are disposed within housing 1606 proximate the one or more apertures 7 such that light emitted by one or more light-emitting elements 80 shines through one or more apertures 7. In some embodiments, apertures 7 are found on housing 1606 in its pre-configured state, e.g., through openings configured to expose communication ports or various other pre-existing apertures. In those configurations, housing 1606 may not need modification to provide apertures 7.

While housing 1611 of second component 1610 is not specifically shown to include the components 20, 110 and 80 (shown to be included in housing 1606) these same components may be also be disposed within housing 1611 and coupled to second component 1610, in addition to being disposed and coupled to first component 1605. In some embodiments a single controller 20 may be used to consolidate controls 20 otherwise provided individually for each of any number of first or second network components.

In use just as with first component 1605, the user can operate control switch 20 of second component 1610 to control the one or more light emitting elements 80 of second component 1610 to produce light of a color selected by the user to correspond to any particular security designation for second component 1610, which can be a designation different from the color selected for security designation for component 1605.

Thereafter, the user can simply observe the color illuminating first component 1605 as well as the color illuminating component 1610 to quickly determine which of component 1605 and 1610 is the component designated or approved for processing information having a given particular security classification.

Figure 2A:
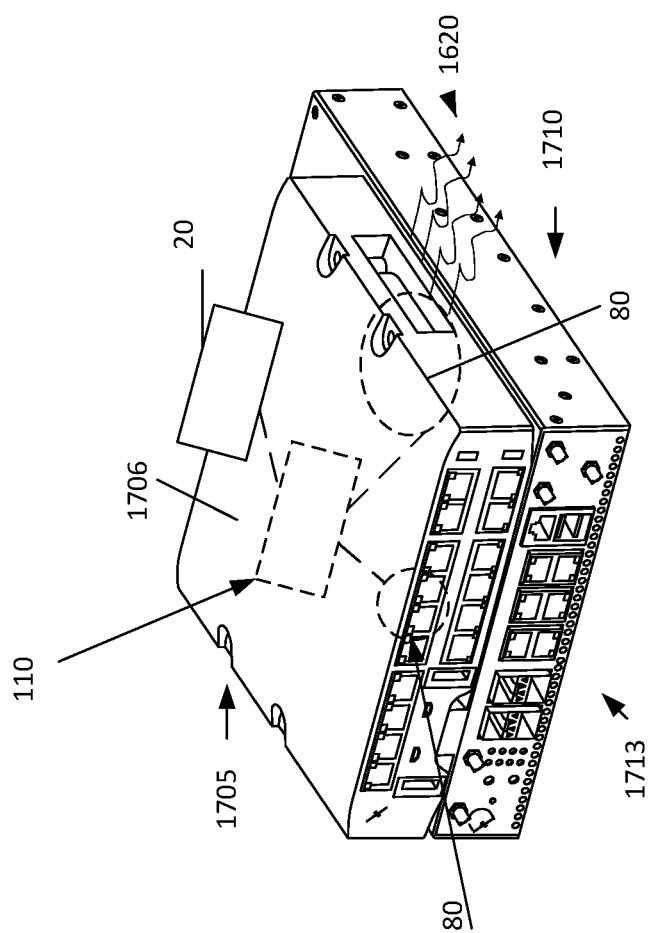
FIG. 2A depicts two additional networked components further implementing embodiments disclosed herein.

FIG. 2 depicts third and fourth network components 1705 and 1710. Third network component 1705 can be designated or approved to process information having one or more of a plurality of possible security designations. Likewise, fourth network component 1710 can be designated or approved to process information having one or more of a plurality of possible security designations.

Each of third and fourth components 1705 and 1710 can be configured and equipped with apparatus 100 and components 80, 110 and 20 just as described above with respect to first component 1605. Thus, for example, the light emanating from housing 1706 of third component 1705 may be green. Green light may correspond to a classification level of Unclassified or For Official Use Only (FOUO). A user observing housing 1706 of third component 1705 can readily ascertain the classification level simply by observing the color. Thus, if the user is processing information that corresponds to equipment having an Unclassified or FOUO classification, the user knows third component 1705 can be used to process that information. The apparatus can be operated to map any classification to any color. Any number of network components can be configured to include apparatus 10 such that each network component thus equipped, can be illuminated by a particular color mapped to particular security designation for that network component.

Devices 1605, 1610, 1705, 1710 shown in FIGS. 1 and 2 can be any type of device. For example, the devices can be routers. However, the embodiments are not limited to routers. The devices shown in FIGS. 1 and 2 can be any type of IT, IP networking, and/or computing devices within which are disposed lighting apparatus 100 coupled for operation with the device.

FIG. 2B is a block diagram of an example lighting apparatus 100. As discussed above, lighting apparatus 100 comprises a user-operable lighting control switch 20, a light control processor 110 and at least one light-emitting element 80. Processor 110 can be implemented as an integrated circuit including a controller 60 coupled to a driver 70. Alternatively, processor 110 can be implemented using a separate controller 60 and driver 70. Processor 110 and light emitting element 80 are disposed within housings of any of first, second, third or network fourth components, and/or within housings of any number of additional network components. In each component, lighting control processor 110 is coupled to light-emitting element 80 to provide drive signals to light emitting element 80 that cause element 80 to emit visible light (indicated, e.g., at 1620) of a user-selectable color.

Figure 3:
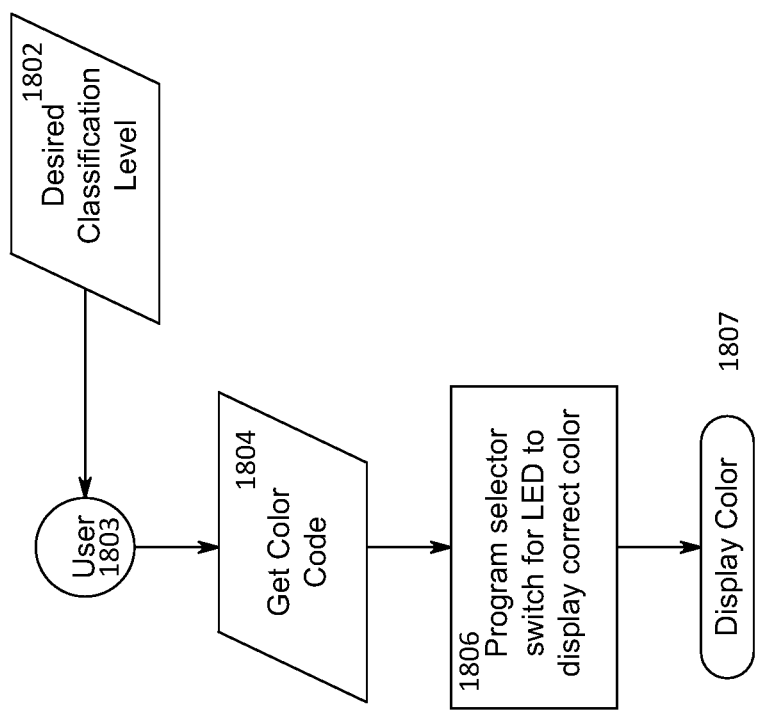
FIG. 3 is a relationship diagram illustrating functions and relationships for implementing embodiments disclosed herein.

FIG. 3 depicts considerations and actions an operator or user of the first, second, third and/or fourth network components, or of any additional network components incorporating apparatus 100 can take. At 1802 a desired classification level for a network component, e.g., network component 1605, is determined. User 1803 can determine a color, or a color code at 1804 (or alternatively software can fetch a color code). The user can program, e.g., via processor 110, or otherwise operate a selector switch 20 (at 1806) to cause processor 110 to control light-emitting element 80 (which can be one or more LEDs) to emit light of a corresponding user-selected color. Thereafter, the user-selected color 1807 corresponding to the desired classification level is detectable by the user simply observing components to identify a housing from which the user-selected color is emanating. For example, where the user-selected color for third network component 1705 is orange, an orange glow can emanate from light emitting elements 80 within housing 1706 of third component 1705. Thus, where the user is handling information having a classification corresponding to the classification signified by the color orange, the user can use third component 1705 to process that information.

Figure 4:
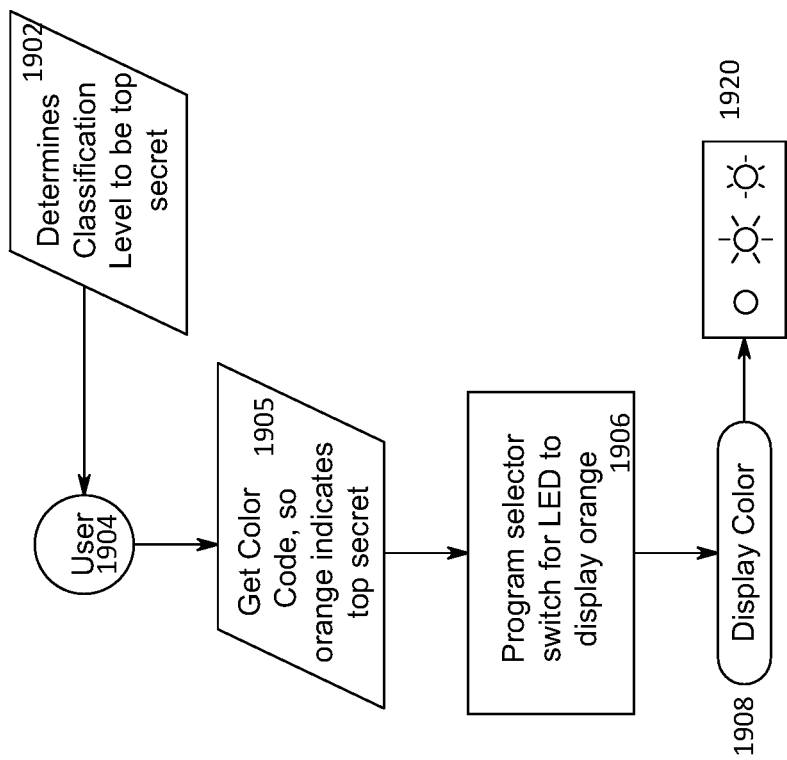
FIG. 4 is a relationship diagram illustrating functions and relationships for implementing embodiments disclosed herein.

FIG. 4 illustrates concepts and actions for implementing embodiments disclosed herein. Block 1902 depicts an action of determining a classification level. In the example shown in FIG. 4 the determined classification level is "top secret". Block 1904 depicts the user. Block 1906 depicts an action, e.g., by user 1904 to manipulate program selector switch 20 to cause light-emitting element 80 (e.g., an LED) to emit (display), e.g., orange colored light as per 1905. Block 1908 indicates the light-emitting element 80 emitting orange colored light accordingly. Thus blocks 1904-1908 map a classification of 'top secret' the color orange, and the mapping is visible on the corresponding network component at 1920 equipped with the apparatus 100 including the switch 20 the user is operating.

Thus, embodiments of apparatus 100 can be included with a network component and operated by a user to map any classification level to any color, and to any network component, in any desired combination.

Figure 5:
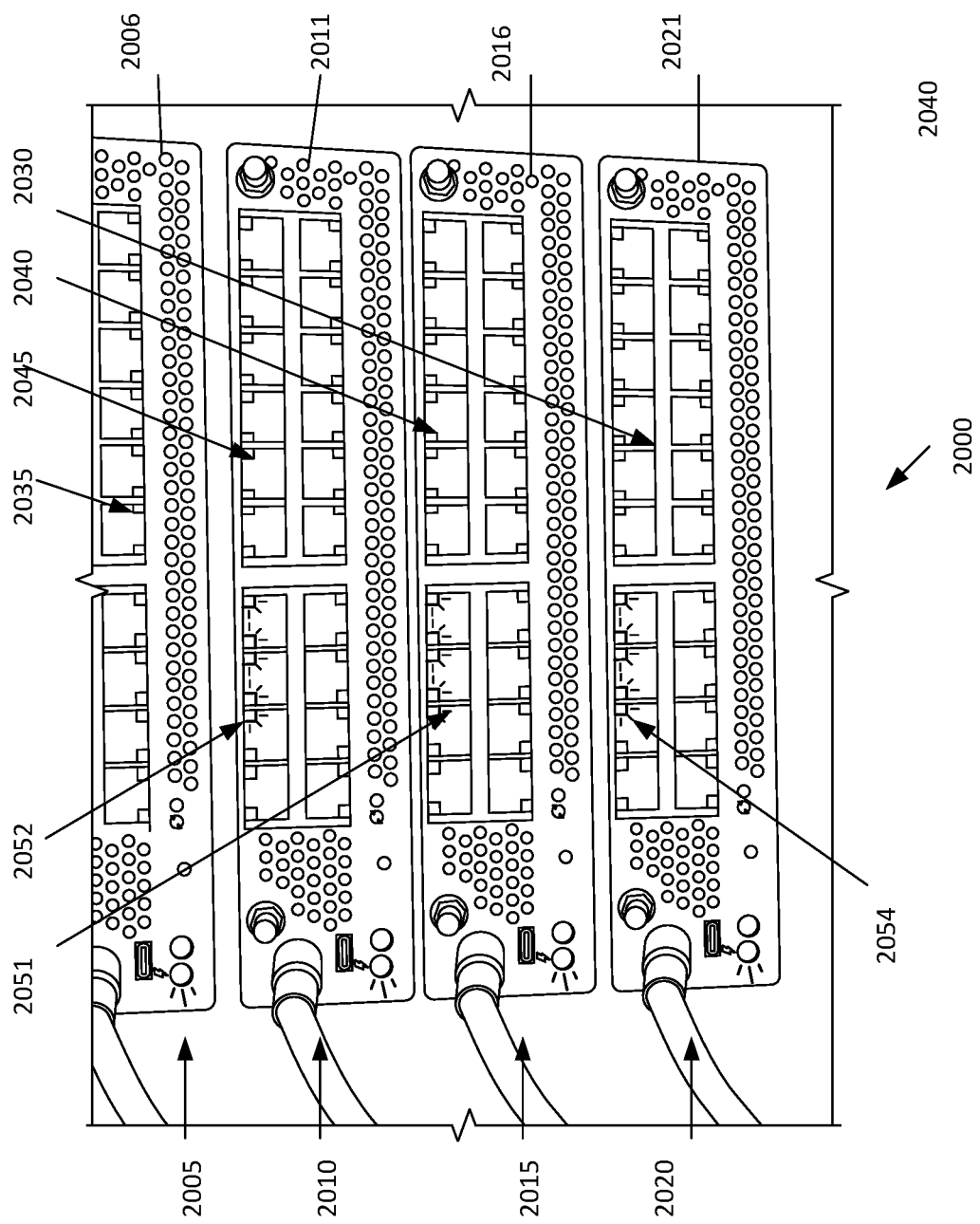
FIG. 5 depicts a stack of four devices each emitting a different color light through the vent holes to indicated a different classification level.

FIG. 5 depicts a stack 2000 of four network components, 2005, 2010, 2015 and 2020 including corresponding device housings, 2006, 2011, 2016 and 2021, respectively. Each housing 2006, 2011, 2016 and 2021 is configured to expose a plurality of communication ports 2035, 2045, 2040 and 2030 respectively. Each communicate port 2035, 2045, 2040 and 2030 includes corresponding vent holes (not visible) through which light (indicated pictorially at 2051, 2052, 2035 and 2054 respectively) is shown to emanate. The colors of the light emanating from the corresponding vent holes (not visible) can be different, and each different color can have a particular corresponding significance, as indicating a different corresponding classification level.

What is claimed is:

1. A network component security system comprising:
    a first lighting element disposed within a first housing of a first network component, the first network component suitable for processing information having a first security classification and not suitable for processing information having a second security classification, the first lighting element capable of emitting light having a selectable one of at least a first and a second color;
    at least a second lighting element disposed within a second housing of a second network component, the second network component suitable for processing information having the second security classification and not suitable for processing information having the first security classification, the second lighting element capable of emitting light having a selectable one of at least the first and the second color; and
    a first user-operable switch coupled to the first lighting element and a second user-operable switch coupled to the second lighting element such that a user can operate the first switch to cause the first lighting element to illuminate the first housing with light of the first color to indicate the first security classification, and the user can operate the second switch to cause the light-emitting element to illuminate the second with the second color to indicate the second classification;
    whereby thereafter the user, given information having either the first or second security classification, can visibly determine by observation of the first and second housings, a suitable one of the first and second network components for processing the given information.

2. The system of claim 1 wherein the first and second light-emitting elements each comprise one or more light emitting diodes (LED), the first and second light-emitting elements disposed within the first and second component housings proximal openings through which emitted light can pass to illuminate the first and second housings according to the user-selected color.

3. The system of claim 2 wherein at least one of the first and second light-emitting elements are disposed with the corresponding housing proximal an RJ45 port, such that light emitted by the at least one light-emitting element exits the housing via an opening proximal the RJ45 port.

4. The system of claim 1 wherein the light-emitting elements are electrically coupled to circuitry comprising a wireless networking device.

5. The system of claim 1 further comprising an automated electronic system configured to receive and transmit software-provided information about the information's classification level.

6. The system of claim 5 further wherein the automated electronic system is further configured to receive and transmit user-provided information about information's classification level.

7. The system of claim 1 wherein at least one of the first and second network components is one of a computer, router, switch, video transcoder or encoders, video wall processor, Radio over IP appliance, or any other electrical appliance configured to communicate or store information.

* * * * *